(12) United States Patent
Baur (10) Patent No.: US 6,182,518 B1
(45) Date of Patent: Feb. 6, 2001

(54) PROCESS FOR MEASURING THE RELATIVE MOVEMENT OF AT LEAST TWO COMPONENTS

(75) Inventor: Peter Baur, Moensheim (DE)

(73) Assignee: Dr. Ing. h.c.F. Porsche AG, Weissach (DE)

(*) Notice: Under 35 U.S.C. 154(b), the term of this patent shall be extended for 0 days.

(21) Appl. No.: 09/017,288

(22) Filed: Feb. 2, 1998

(30) Foreign Application Priority Data

Jan. 31, 1997 (DE) .............................................. 197 03 488

(51) Int. Cl.$^7$ ........................ G01M 17/00; G01M 19/00; G01B 21/00; G01D 7/02
(52) U.S. Cl. ........................... 73/865.9; 73/1.79; 702/94; 702/150
(58) Field of Search ................................ 73/865.9, 1.79; 702/94, 150

(56) References Cited

U.S. PATENT DOCUMENTS

| 3,816,712 | 6/1974 | Herzog .............................. 235/92 MP |
| 4,817,470 | 4/1989 | Mueller et al. ......................... 74/866 |
| 4,897,635 | 1/1990 | Topping ................................ 340/681 |
| 5,094,128 | * 3/1992 | Kamada ................................ 74/856 |
| 5,337,848 | * 8/1994 | Bader ................................. 180/65.2 |
| 5,365,841 | * 11/1994 | Uhrig ................................. 101/212 |
| 5,930,905 | * 8/1999 | Zabler et al. ......................... 33/1 PT |

FOREIGN PATENT DOCUMENTS

| 457 880 | 3/1928 | (DE) . |
| 30 21 489 A1 | 12/1981 | (DE) . |
| 40 20 340 A1 | 1/1991 | (DE) . |
| 42 02 722 A1 | 8/1993 | (DE) . |
| 42 02 083 C2 | 1/1994 | (DE) . |
| 42 37 669 A1 | 8/1994 | (DE) . |
| 195 06 938 A1 | 8/1996 | (DE) . |
| 0 474 362 A2 | 3/1992 | (EP) . |
| 0 482 403 A1 | 4/1992 | (EP) . |
| 2 274 526 | 7/1994 | (GB) . |

OTHER PUBLICATIONS

Bodschwinna, Horst, Boesche, Harald: Schmiedeteile rationell pruefen. In: TR Technische Rundschau, vol. 42, 1991, pp. 54–62 Month Not Given.

Hensgen, G., Prinz, L.: Trennung von Drift–und Rauschanteilen in Messreihen durch numerische Hoch–und Tiefpassfilterung. In: VDI–Berichte, No. 509, 1984, pp. 131–136 Month Not Given.

Agba, Emmanuel, I.: SeaMaster: An ROV–Manipulator System Simulator. In: IEEE Computer Graphics and Applications Jan. 1995, pp. 24–30.

Pandzic, Igor, Sunday, Kalra, Prem, Thalmann, Nadia, Magnenat: Real–time facial interaction. In: Displays, vol. 15, No. 3, 1994, pp. 157–163 No Month Given.

Vehicle Speed Sensor Signal Generation Using Wheel Speeds. In: Research Disclosure, Sep. 1994, p. 479 #36525 Anonymous.

* cited by examiner

Primary Examiner—Thomas P. Noland
(74) Attorney, Agent, or Firm—Evenson, McKeown, Edwards & Lenahan, P.L.L.C.

(57) ABSTRACT

The invention provides a process for measuring the relative movement of at least two components, such as a fixed wheel, a loose wheel and a sliding sleeve of a synchronizing device. For analyzing the measuring values after the detection thereof, first at least a portion of the measuring values is adjusted by linking them with one another, taking into account known marginal conditions. By means of a subsequent standardization of the series of measuring values, in addition, as required, the reference system (the location of the observer of the measurement), can be freely selected. Thus, it is possible to observe the event from a particularly suitable reference system, such as the synchronizing rotational speed. The joint display of the series of measuring values precisely defines the relative movement of the observed components.

12 Claims, 5 Drawing Sheets

PROCESS FOR MEASURING THE RELATIVE MOVEMENT OF AT LEAST TWO COMPONENTS

BACKGROUND AND SUMMARY OF THE INVENTION

This application claims the priority of German patent document 197 03 488.8, the disclosure of which is expressly incorporated by reference herein.

The invention relates to a process for measuring the relative movement of at least two components.

The measuring of the relative movement of components with respect to one another is important wherever these components interact with one another. Operations in which such interactions occur, for example, are engaging operations in clutches, the moving of a tooth of a gear wheel into the tooth space of a second gear wheel, displacements of meshing gearwheels under load, bending of shafts and bodies, and many other operations. Such measurements are carried out in order to more closely examine the course of the observed event.

In this context, very high demands are made on the measuring precision. In addition, the analysis of the measuring value becomes difficult, particularly when the observed components are moved not only with respect to one another but each component is also moved separately. Other components which cannot be measured by measuring techniques also influence the sequence of movements. In brief, the analysis of the measuring values becomes difficult because several parameters influencing the sequence of movements must be analyzed simultaneously.

The measuring of the synchronizing operation when a gear in a synchronized vehicle transmission is engaged, which so far has been difficult, can be used for demonstrating this problem:

A known observation of this operation by visual methods presents problems because the corresponding components move fast and observing them is difficult because of the excess oil.

In a known detection of the rotating movements by corresponding angular momentum generators, because of the rotational speed level as well as the measuring inaccuracies of the rotational speed generators, the actual event of the synchronization which takes place in a range of smaller changes of the detected signals is difficult to identify and analyze.

The moving direction of individual components can briefly change during the contact. Direction change is difficult to reproduce by conventional illustration methods, for example, line recording of the rotational speeds.

As a rule, the contact of components causes a change in the movement direction or a change of their speed. In the case of rotating components, this momentum change is normally detected by measuring techniques as a change of the rotational speed. Without any further analysis, this often brief change of rotational speed provides little information regarding the direction of force, angular change or contact points.

These and other objects and advantages are achieved by the measurement process according to the invention in which, after detecting the series of measuring values, while first taking into account known marginal conditions, at least a portion of the series of measuring values is adjusted by a mutual linking. By using known marginal conditions during the adjustment of the series of measuring values, the precision of the measurement is clearly improved using simple devices and without any additional expenditures with respect to the sensor assembly or the measuring process. As a result of the marginal conditions, the relationship of the measuring value in the range of the marginal conditions is known precisely or nearly so.

Furthermore, by means of a subsequent standardization of the series of measuring values, as required, the reference system, that is, the location of the observer of the measurement is freely selectable so that it is possible to observe the event from a particularly suitable reference system. The common representation of the series of measuring values precisely defines the relative movement of the components to be observed so that, on the whole, an analysis of the measurement is possible. This improves the precision and its ability to be analyzed.

An example of an adjustment while taking into account suitable marginal conditions is the following: If, during a measurement, two components, in this case, two gear wheels, move at precisely the same speed because they mesh with one another without slip, as a rule, a different rotating speed of a few rotations per minute is sensed as the measured quantity. This rotational speed difference, which differs from the actual value, has its causes in the measuring precision of the measuring chain of both components which is finitely limited and is within a permissible tolerance (see also FIG. 3). The speed difference, which is determined for reasons of a measuring inaccuracy, is computed as an "offset" from the mathematical difference of both signals and is added to the numerical values of the measured speed of at least one of the two components. Only a time range may be used for the speed adjustment in which the above-mentioned marginal conditions (speed equality) are valid. This ensures that the numerical values of both speeds, on the average, exhibit no relative deviations. The speed offset can be determined very precisely when one copy of the measuring series is smoothed by means of a digital (e.g., Butterworth) low-pass frequency of approximately 5% of the used sensing frequency and the difference is formed from the smoothed signals. The speed adjustment is permissible only if the measuring chains of the measured components are within the tolerance of a required measuring accuracy and within the measuring range valid for the respective measuring chain (outside an unacceptable limit range). In addition, it must be ensured that the measuring value sensing system has no aliasing effects or other systematic disturbances.

It is suggested to first calculate a position of the components from the series of measuring values. For this purpose, the pertaining movement or rotations are normally computed from the numerical values of the measured speeds or rotational speeds by means of a time-related integration. From the numerical values of the measured accelerations, the pertaining movement or rotations are calculated by a double time-related integration. In the case of each of these integrations, an integration constant will occur which is determined by the marginal conditions and is fixed to suitable values. This results in a positional adjustment of the components. The following is a corresponding example: By means of the present invention, the angle of rotation of mutually meshing components can be determined (for example, in the case of synchronous couplings), from the integration of the rotational speeds. The integration constants will be determined such that, at a selected point in time, where the components mesh with one another, the angle of rotation of the first components is 0° and the angle of rotation of the second component amounts to the matching angular pitch. Thus, a penetration of the bodies is impossible. The position of both components is therefore determined.

If, as suggested, the marginal conditions for adjusting the series of measuring values are selected such that these marginal conditions are within the range of an event to be observed, that is, are valid in this range, the precision is increased exactly where the key point of the observation is situated. All conditions may be used as marginal conditions which increase the analysis and measuring precision.

To standardize the measuring values, it is suggested to use one of the series of measuring values. In this approach, the observer's location is identical with that component whose measuring values, such as its rotational movement, were used for the standardizing.

As an alternative, it is suggested to use a fixed value for the standardizing. In this approach, the observer takes up an apparently fixed location. It would be particularly advantageous if, in addition, this fixed value were to be selected from one of the series of measuring values. The reason is that the location of the observer would correspond to the position or movement of an observed component at a fixed point in time. Thus, changes of speed and direction relative to the reference system of the observed moved component become particularly easily visible.

In addition to the measured parameters, while utilizing geometric and physical marginal conditions, the position of additional components can be estimated with high precision and can be determined by means of the same method.

For the joint representation of the series of standardized measuring values, it is suggested to represent these as time-parallel lines in a diagram form. This permits a direct comparison of the different series of measuring values and an analysis of the measurement.

As an alternative, it is suggested that photo-realistic computer graphics or images, which are moved (that is, animated) by means of the series of standardized measuring values, be used for the representation of the observed components. In this case, it is particularly advantageous that also complex operations with different movements, such as combined rotational and longitudinal movements, are also represented in a clear and simultaneous manner which clearly improves the analysis of the measurement. The visual display permits an additional plausibility control of all measured parameters and provides a deeper understanding of the measured operation. By means of a perspectively correct display of the geometry, critical contact points can be recognized and clues can be obtained therefrom for constructive measures.

In this type of display, it is possible to change the visual characteristics of the objects used for the display or to select them such that additional information can be obtained. Thus, for example, a transparent or cut-open display of a sliding sleeve permits viewing the components disposed underneath or reviewing the engaging range of the toothings.

An observation in order to compare the different operations is also possible, whether in a time sequence (in order to determine the consequences of wear) or after constructive changes in that the different displays are stored and are then displayed in a time-parallel manner. The suggested process is particularly suitable for the comparison of a simulation and a measurement since the same method will now be used for the display. For the same reason, it will now also be particularly simple to integrate the results of the measurement into a CAD-system or a CAD-display.

It must be appreciated that such a clear type of display considerably facilitates the understanding of the observed movement sequences, provides visual information about movement dynamics and contact points and facilitates the fast introduction into the topics. This understanding results in ideas concerning solutions and suitable countermeasures.

The illustrated process may also be used for measuring the relative movement during the synchronizing of a clutch. This application is particularly advantageous because the synchronization operation has superimposed rotational and sliding movements of several components; specifically, the movements of the components pinion shaft, loose wheel and sliding sleeve. The pinion shaft component includes a synchronizing ring which is connected with it. Because of the shape of the components, these movements are subject to geometric marginal conditions and an analysis of the measurement is possible only when simultaneously considering all movements. Thus, within the framework of the application suggested here, as a marginal condition for the linking of the series of measuring values, it is assumed that, in the engaged condition, the rotational speeds of the pinion shaft, the fixed wheel and the loose wheel are identical and that the position of the sliding sleeve in the engaged condition is known.

The suggested application can be further improved particularly with respect to the representation and the ability of the measurement to be analyzed, if the rotational speeds of the pinion shaft and of the loose wheel takes place on the basis of one of the two rotational speeds. The representation of the component movement takes place relative to a standardized movement. Because of the standardizing, the component whose series of measuring values is used for the standardizing appears to be stationary so that the movements of the other components can be observed precisely. This is advantageous particularly in the range of the final synchronization.

In this context, it was found to be particularly advantageous to use for the standardization not a series of measuring values but the rotational speed of the clutch, that is, the rotational speed of one of its components in the engaged condition as a fixed measuring value. The location of the observer is now the synchronizing rotational speed so that movements of the pinion shaft connected with the vehicle mass, as well as of the loose wheel during the actual synchronizing operation, are displayed In particular, it is also possible, in this case, to display or to recognize a vibration of the pinion shaft. In the display, the components seem to virtually move into the synchronization operation.

On the whole, the present invention provides not only a process, but an application of this process which is very useful in the case of new developments during the elimination of series-related problems. As a result, it is possible to rapidly implement the identification of causes, recognition of operating mechanisms and the development of remedial measures.

Other objects, advantages and novel features of the present invention will become apparent from the following detailed description of the invention when considered in conjunction with the accompanying drawings.

DETAILED DESCRIPTION OF THE DRAWINGS

Figure 1:
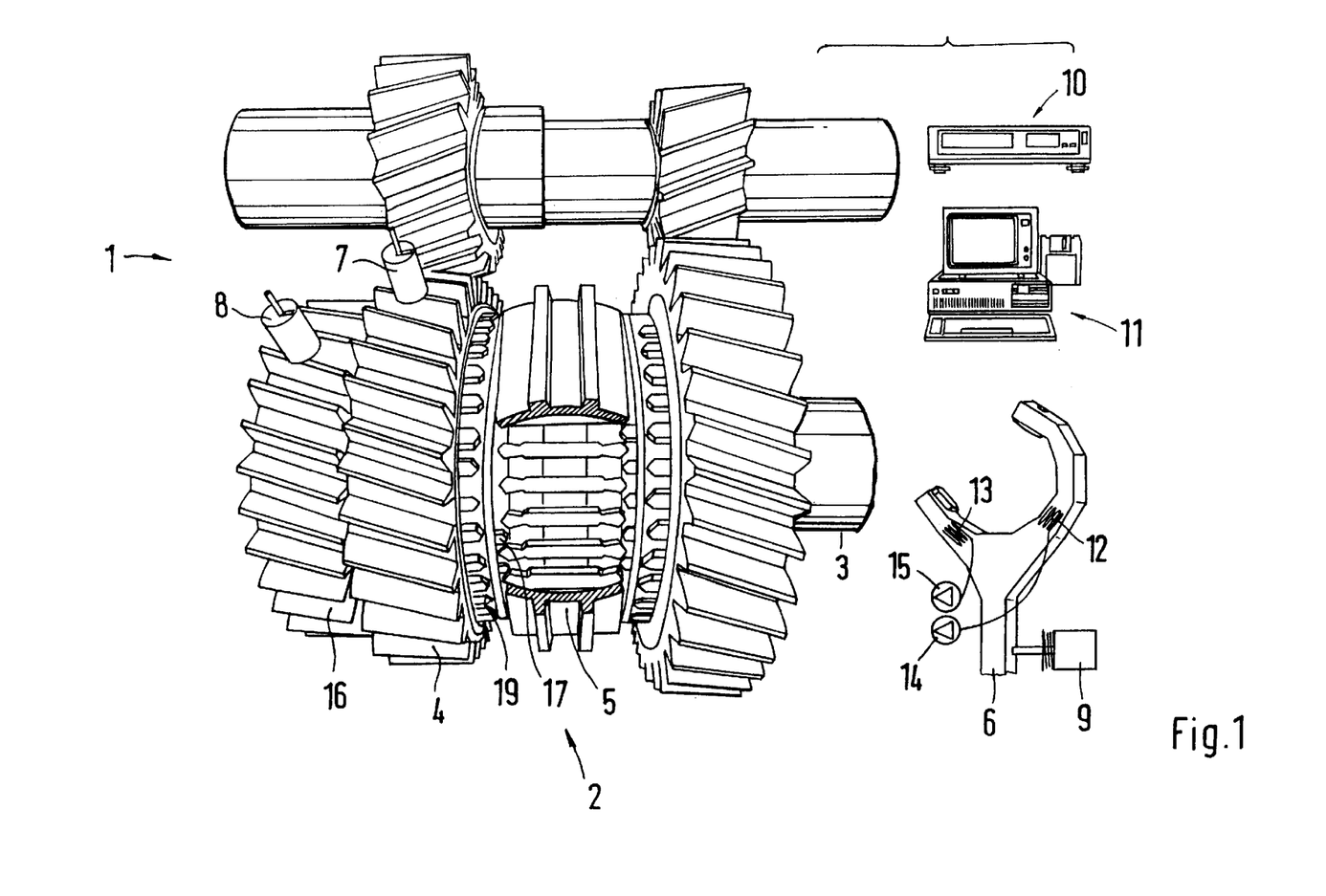
FIG. 1 is a view of a system for measuring and displaying the operation of a synchronization in the case of a shift-operated vehicle.

FIG. 1 illustrates a partial range of a synchronized vehicle transmission 1 with a synchronizing device 1. The synchronizing device 2 consists of a pinion shaft 3, a loose wheel as well as a sliding sleeve 5. For better inspection, the sliding sleeve 5 is illustrated to be partially cut open and shows the toothing disposed underneath it and a synchronizing ring 17, which is axially movably held on a synchronizing body (not shown) connected with the pinion shaft 3. The sliding sleeve 5 is moved by a shift fork 6. A clutch body 19 is provided on the loose wheel 4 and the sliding sleeve 5 can be slid onto the clutch body 19 so that, when a gear is engaged (that is, when the sliding sleeve 5 is pushed on completely), the pinion shaft 3 and the loose wheel are non-rotatably connected.

For reducing the expenditures for assembling the sensors, the rotational speed of the sliding sleeve 5 or of the pinion shaft 3 is measured on a gear wheel 16 non-rotatably connected therewith by means of an angular momentum generator 8. For measuring the rotational speed of the loose wheel 4, an angular momentum generator 7 is provided. Both angular momentum generators 7, 8 interact with toothings, specifically the toothing of the gearwheel 16 and the toothing of the loose wheel 4. A path sensor 9 is connected with the shift fork 6. The forces applied to the shift fork 6 are determined by means of glued-on wire strain gauges 12 and 13. The signals of the wire strain gauges are processed by means of suitable measuring amplifiers 14 and 15. After the processing in the measuring amplifiers 14, 15, the signals of the angular momentum generators 7 and 8, of the path generator 9 and of the wire strain gauges 12 and 13 are sensed by a recording apparatus 10 and are intermediately stored or fed directly into an analysis device 11, in this case, a computer unit with a video screen.

Figure 2:
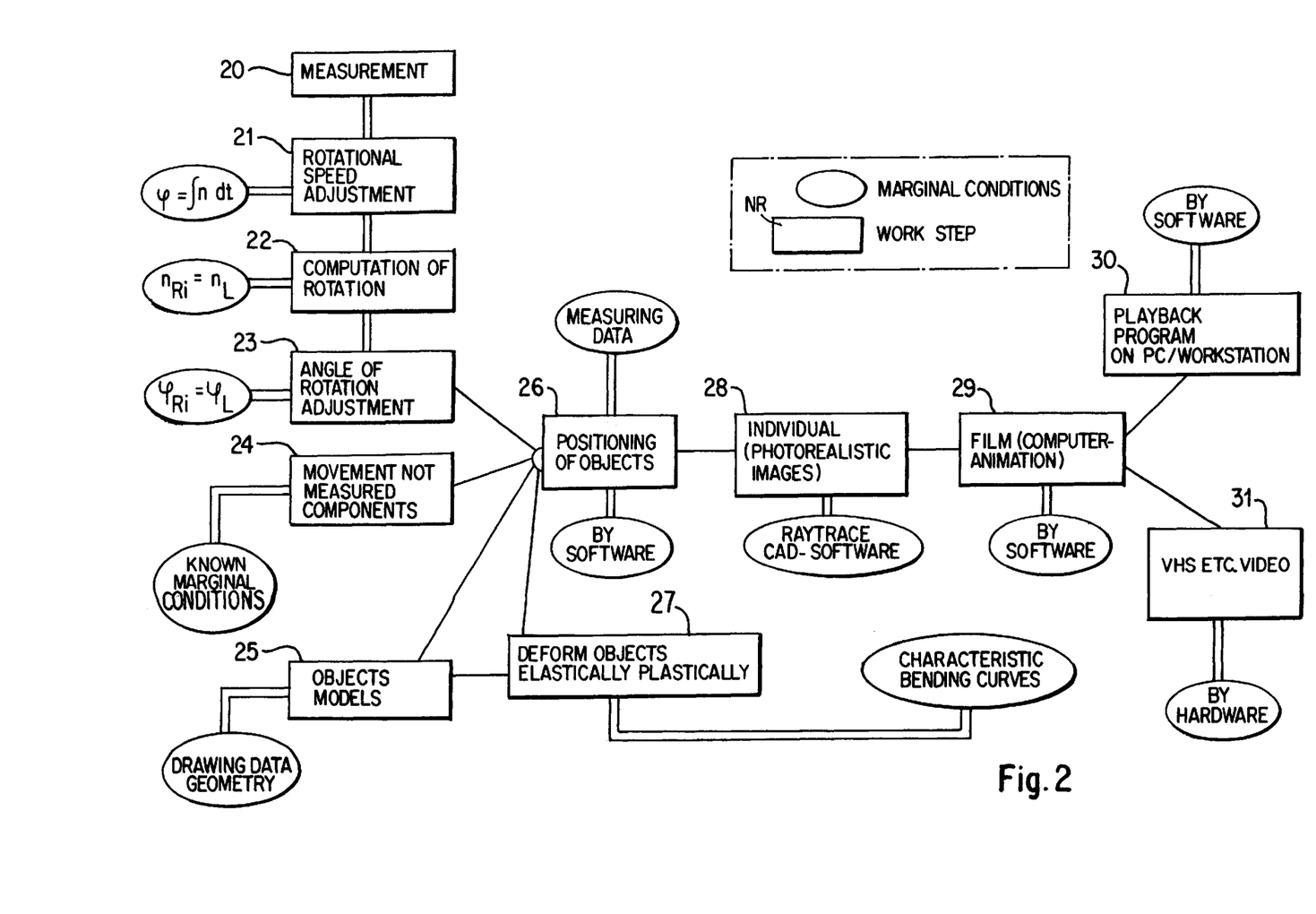
FIG. 2 is a flow chart of the process for determining the relative movement of the participating components.

The process, which is shown as a flow chart, for measuring the relative movement of the loose wheel, the pinion shaft 3 (i.e., the synchronizing ring 17) and the sliding sleeve 5 (i.e., the shift fork 16) takes place in the computer unit 11. In a first step 20, the pertaining measuring values, specifically the rotational speed of the pinion shaft $n_{Ri}$, the rotational speed of the loose wheel nL, the path of the sliding sleeve s and the force applied to the shift fork, are detected by measuring as a series of measured values. Care should be taken in this case that the signal processing is protected from signal noises and aliasing effects by suitable low-pass filters. For computation of good angles low-pass filters which are as high as possible and high scanning rates (for example, 1,000 measurements per second) are recommended.

The processing of the rotational speed signals and the determination of the angles of rotation takes place in the next step 21. For this purpose, it is necessary to keep the offset error caused by the measuring technique, mainly of the rotational speed signals, as low as possible. It is suggested that the following marginal condition be utilized: First, in the case of an engaged gear, the rotational speeds of the pinion shaft 3 and the loose wheel 4 are identical; and second in the case of an engaged gear, the toothings of the clutch body 19 and of the sliding sleeve 5 mesh with one another without mutually penetrating one another so that the relative angle position of the clutch body 19 and the sliding sleeve 5 is known.

Furthermore, it is determined in step 21 when the synchronizing point has been reached, that is, when the pinion shaft 3 and the loose wheel 4 are fixedly connected with one another by means of the sliding sleeve 5 and the synchronization has taken place.

For determining the synchronizing point, it is taken into account that the sliding sleeve 5 is always non-rotatably connected with the pinion shaft 3 by way of the synchromesh body 18. Between the sliding sleeve 5 and the loose wheel 4, by means of the synchronizing device 2, which is known per se, in the case of different rotational speeds between the sliding sleeve 6 the pinion shaft 3 and the loose wheel 4, only a force-locking connection is first established and a further sliding on the sliding sleeve 5 onto the clutch body 18 of the loose wheel 4 is avoided. Only at an approximately identical rotational speed, is a further sliding of the sliding sleeve 5 onto the clutch body 18 permitted, so that now a form-locking connection and therefore a connection with identical rotational speeds can be established.

The synchronizing point can be determined automatically as well as manually. In the case of an automatic evaluation, the position of the sliding sleeve 5 or an identical course of the rotational speed of the pinion shaft 3 and the loose wheel 4 is used as an indication. Since the measuring of the position of the sliding sleeve 5 is measured indirectly, specifically by measuring the longitudinal movement of the shift fork 6, it is provided for improving the precision of the measurement to also determine a possible bending of the shift fork 6. For this purpose, the wire strain gauges 12 and 13 are provided on the shift fork 6 and, acting as force sensors, detect the actuating force exercised on the shift fork 6. The measured shift fork force is calculated back in step 27 to the pertaining fork bending by means of another marginal condition (specifically a previously carried-out bending measurement with the assignment fork bending by way of the shifting fork force). Finally, in step 26, the fork bending is taken into account when determining the position of the sliding sleeve 5.

After the determination of the synchronizing point, the rotational speed of the pinion shaft in the synchronizing point $n_{Ri}$ $(t=t_{Synch})$ is determined as the synchronizing rotational speed $n_{Synch}$. The point in time of the synchronizing point $t_{sync}$ is also determined.

Step 21 uses the fact that, in the synchronizing point, the position of the sliding sleeve 5 (completely engaged) as well as the ratio of the rotational speed of the pinion shaft $n_{Ri}$ to the rotational speed of the loose wheel $n_L$ ($n_{Ri}=n_L$) are known. Taking into account these known marginal conditions, the measuring value series $N_{Ri}(t)$ and $n_L(t)$ are now linked, in that a rotational speed offset is determined as the difference between the rotational speed $n_{Ri}$ of the pinion shaft and the rotational speed $n_L$ of the loose wheel in the time range of the form closure. Subsequently, the series of the measuring values for the rotational speed of the pinion shaft $n_{Ri}(t)$ is modified with the rotational speed offset by addition:

$$n_{Ri}'(t) = n_{Ri}(t) + [n_L - n_{Ri}]_{t>tSync}$$

Figure 3:
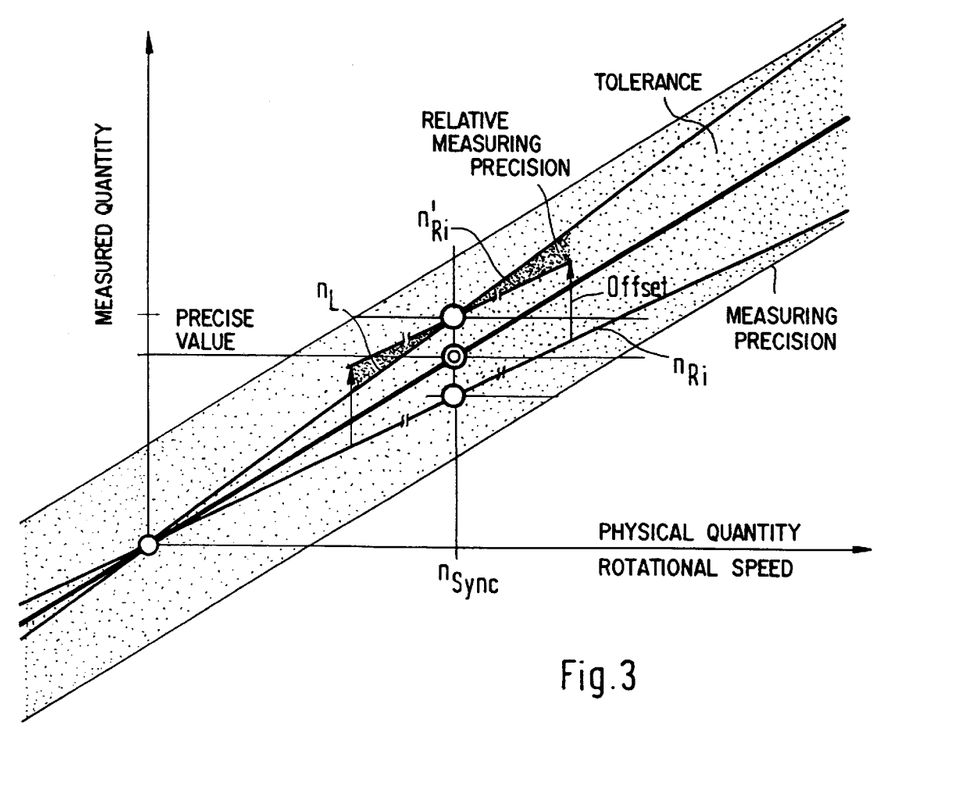
FIG. 3 is a diagram of the measuring precision and the tolerance of measuring chains.

The effect of the above-described step 21 can be explained by the diagram shown in FIG. 3. Both the rotational speed signal $n_{Ri}$ of the pinion shaft and the rotational speed signal $n_L$ of the loose wheel include a measuring error, which is the result of systematic measuring errors. In the diagram according to FIG. 3, this measuring error is represented by different slopes as well as by a different offset of the shown characteristic curves of the rotational speed signals. By means of the correction carried out in step 21, the characteristic curve for the rotational speed $N_L$ of the loose wheel is now displaced such that, in the point of the synchronizing rotational speed $n_{Sync}$, it coincides with the characteristic curve for the rotational speed $n_{Ri}$ of the pinion shaft. Thus, in the range of the synchronizing rotational speed $n_{Sync}$ (and therefore also in the range which is most significant for the measurement) the error in the sense of a difference between the two rotational speed signals $n_L$ and $n_{Ri}$, is clearly reduced. This measure naturally does not reduce the absolute measuring error; that is, the error of the display of the rotational speed value continues to be an exclusive function of the measuring precision of the used rotational speed sensor.

In the present case, the measuring is used mainly for observing the signals in a comparatively small speed range, specifically in the range of the synchronizing rotational speed $n_{Sync}$. If, in contrast, the rotational speed signals $n_L$ and $n_{Ri}$, are to be compared with one another over a larger range, it is required to adjust, as described in Step 21 and illustrated in FIG. 3, not only the two characteristic curves by a parallel displacement, but also at least two points of the characteristic curve so that, in the range to be observed, the characteristic curves largely coincide with respect to the offset as well as with respect to the slope.

In the next step 22, in the diagram according to FIG. 2, the measured and adjusted rotational speed signals $n_L$ and $N_{Ri}$ are integrated with respect to time, and thus the movement of the components (change of the angle of rotation) is computed.

Another marginal condition, specifically that the sliding sleeve at the point in time $t=t_{Sync}$ meshes without penetration with the toothing of the clutch body 19 on the loose wheel 4, permits an angle of rotation adjustment in step 23. At the point in time $t=t_{Sync}$, the two components are in the theoretical position 0° (=constructive zero position) which ensures a meshing of the teeth. In this case, as well as when determining the position of the other components, it is assumed that the bodies are rotationally symmetrical and free of pitch errors, unbalanced masses or eccentricities. It is also assumed that the axial position of the loose wheel 4, and thus of the clutch body 19 is constant. The observation of the measured and calculated parameters before, during and after the synchronizing point in time $t=t_{Sync}$, therefore allow conclusions concerning the shifting sequence, the movements and the interaction of the individual components.

In step 24, the movements of components are determined which cannot be detected by measuring techniques. The described method is particularly advantageous when also representing components whose movement is very difficult to detect by measuring, but nonetheless whose position can be estimated from geometric and physical marginal conditions. The synchronizing ring 17 of the synchronizing unit 2 is, for example, difficult to access by measuring techniques. This because, on the one hand, the space in the region of the synchronizing ring 17 is very limited and, on the other hand, during the synchronization phase, the sliding sleeve 5 is pushed over, and covers, the synchronizing ring 17.

Figure 4:
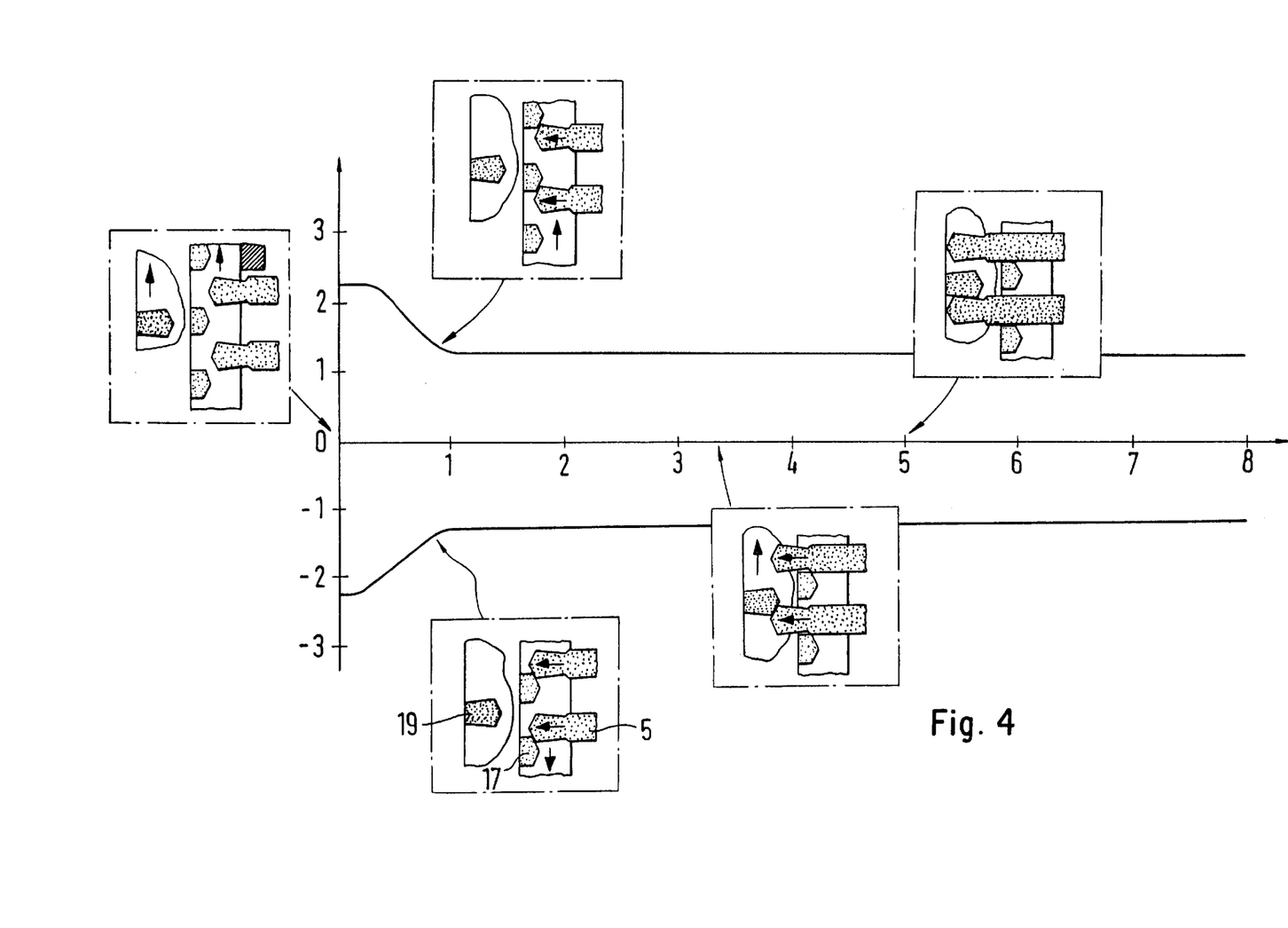
FIG. 4 is a view of the angle of rotation range of the synchronizing ring relative to the movement of the sliding sleeve.

The following marginal conditions can be used when describing the movement of the synchronizing ring:

1. In the unshifted condition, the position of the synchronizing ring 17 is irrelevant; it can therefore be positioned in its "center position" 0 (the constructive zero position).
2. When the fork 2 moves the sliding sleeve 5 in the direction of the loose wheel 4, the synchronizing ring 17 is also moved in the direction of the loose wheel 4 to the friction surface. In this case, the movement of the sliding sleeve 5 as well as the axial force measured at the shift fork 6 can also be used as the basis of the axial movement of the synchronizing ring 17.
3. The synchronizing ring 17 can move axially only until the friction surfaces contact one another. The end position of the synchronizing ring 17 is determined by a wear measurement carried out before the measuring.
4. The rise of the axial force measured at the shift fork 6 is an indication of the contact of the friction surfaces. Because of the existing rotational speed difference and the axial force, the synchronizing ring 17 rotates to its constructively given stop, and in the process locks the continued sliding of the sliding sleeve 5.
5. The rotating direction is always a function of the rotational speed difference between the loose wheel 4 and the sliding sleeve 5 or the pinion shaft 3.
6. During the synchronizing phase, a further rotation of the synchronizing ring 17 relative to the sliding sleeve 5 is impossible when the synchronizing ring 17 has reached the interior stop. In this case, the rotating movements of the pinion shaft 3, the sliding sleeve 5, and thus of the synchronizing ring 17 are identical.
7. When the rotational speed of the pinion shaft 3, the sliding sleeve 5 and the synchronizing ring 17 has been equalized, the synchronizing ring 17 will follow the movements of the loose wheel because of the frictional engagement but only within its constructively given clearance (see FIG. 4).
8. If the fork 2 moves the sliding sleeve 5 farther in the direction of the loose wheel 4, the synchronizing ring 17 will be rotated relative to the sliding sleeve 5 unless it already releases the movement of the sliding sleeve 5 by the movement of the loose wheel 4. The synchronizing ring 17 must "make room" for the sliding sleeve 5 because a penetration of both bodies is impossible (see also FIG. 4).
9. In the shifted condition of the synchronizing device 2, the form closure in the area of the clutch body 19 on the loose wheel 4 is ensured by the axial position of the sliding sleeve 5. The rotation can then be positioned, for example, in the center position (0°=constructive zero position).

The movement of the synchronizing ring 17 can therefore be determined with satisfactory precision by mathematical linking of the rotational speeds of the sliding sleeve 5 or the pinion shaft 3 and the loose wheel 4, as well as the axial fork force and the movement of the sliding sleeve taking into account the marginal conditions.

Figure 5:
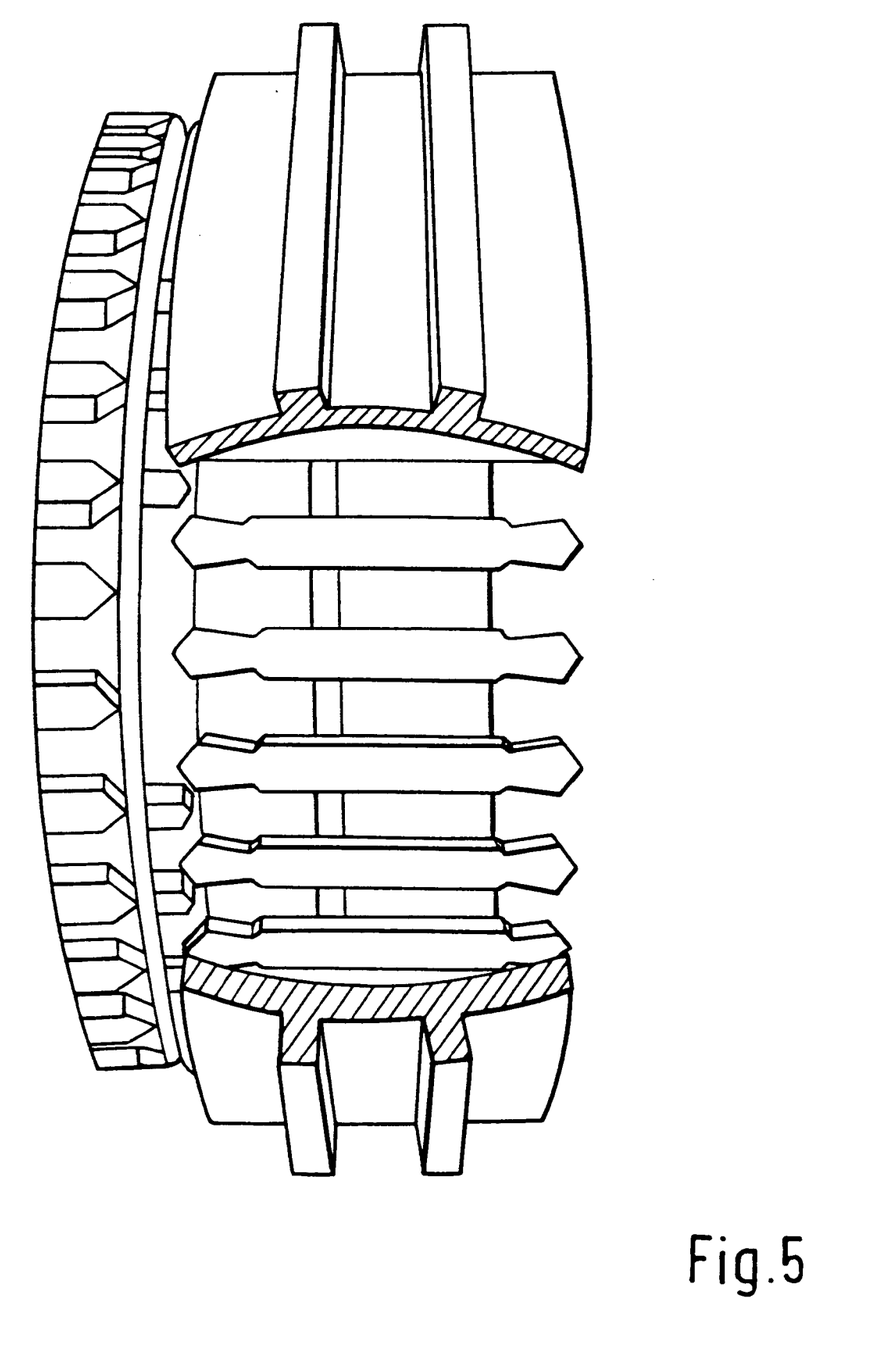
FIG. 5 is a photo-realistic display of the observed components of a synchronizing device as used in the illustrated measuring process.

For further analysis, a suitable form of representation is selected which is capable of jointly displaying the components which are of interest (specifically, the synchronizing ring 17, the clutch body 19 of the loose wheel 4 and of the sliding sleeve 5) and their movements. This display is generated in the embodiment on an analyzing device 11 constructed as a personal computer by means of a CAD program. FIG. 5 shows the three-dimensional representation of the synchronizing unit 2, as generated by means of the analyzing device 11. All components of the synchronizing unit 2, which do not contribute to a further understanding, can be omitted. With respect to their geometry, the display of the individual components corresponds to the real dimensions of the components and is constructed in step 25 true to scale from the data of the drawing. This step 25 can be carried out independently of the remaining analysis process.

In step 26, the series of measuring values for the rotational speed signal $n_{Ri}(t)$ of the pinion shaft, the rotational speed signal $n_L(t)$ of the loose wheel and the path signal $s(t)$ of the sliding sleeve are combined. That is, by means of the measuring data, a rotation or displacement of the pertaining components (objects) is carried out in the CAD-program. In this manner, all objects are positioned and aligned (rotation, displacement) for each individual measuring point and thus moved precisely like the real object during the measuring. In the course of combining the measuring data, the series of measuring values are standardized, in this case the rotational speed signals, by means of the synchronizing rotational speed $n_{Sync}$. Here, the value of the synchronizing rotational speed $n_{Sync}$ is subtracted from the other rotational speed signals. As a result, the reference system in which the rotational speed signals are represented is changed. While the original series of measuring values were detected in a reference system with a fixed position, the standardized series of measuring values are based on a reference system with a rotational speed equal to the synchronizing rotational speed $n_{Sync}$. In the present case, this means that, in the reference system on which the standardized series of measuring values are now based, all components stop when the synchronizing point is reached.

If a CAD-program which can work with three-dimensional objects, in addition to a movement of the display by means of the measuring data, is used, a change of the observation angle of the display is also possible, e.g., rotating, displacing or zooming.

In addition, for a precise determination of the position of the components, by means of measuring before the test run, positional tolerances, the wear condition and the actual installation position can be determined.

If additional marginal conditions are known, in a step 27 which is situated before step 26, plastic or elastic deformations (e.g., bending caused by force) can also be worked into the display of the objects.

Since, at this point, the position and the movement of all participating components are known, in the steps which follow, a joint display of the participating components can take place, and thus a joint display of the standardized series of measuring values occurs.

In step 28, a photo-realistic image is computed by means of suitable "Ray Tracing Software" or "CAD-Software" which represent the computer models with the surface, light and shade characteristics in a perspectively correct manner. As an alternative, the representation can also take place on surface-oriented contour models which, unfortunately, narrow the information content. As a result, information can be lost by way of the contact geometry. By means of this "Ray Tracing Software" or "CAD Software", an individual image is generated for each measuring point from the positioned component objects.

After all individual images have been obtained from a measuring cycle, in step 29, the individual images are combined by means of the suitable software to form a film or a computer animation which are then displayed in step 30, either by means of a playback program on a user interface (PC, work station, etc.) or in step 31, after a conversion, are displayed on a video data carrier. Naturally, the last-mentioned processing steps for the animation can also be carried out jointly, or by means of other programs or a single suitable program.

In the case of the embodiment, the special advantage of the indicated approach is that the extremely complex operation of the synchronizing can be observed from a location which is normally not accessible to the user. Since, in the embodiment (FIG. 4), the representation of the sliding sleeve 5 was cut in the area of the tooth base, on the video screen, the engagement of the different toothings during the synchronization operation can be followed in an ideal manner, and the determination of possible errors and error causes is clearly facilitated. Selection of the synchronizing rotational speed $n_{Sync}$ as the fixed observation point (compare step 26), makes it possible, in contrast to other measuring processes, to simultaneously display the movements of the loose wheel 4, the pinion shaft 3 connected with the vehicle mass, and the sliding sleeves 5. Thus, when the introduced measuring process was used, vibrations of the pinion shaft 3 about the synchronizing rotational speed $n_{sync}$ could be determined. Previously, it had generally been assumed that, because of its large rotating mass connected with the inertia of the vehicle, the rotational speed of the pinion shaft $n_{Ri}$ is constant.

The illustrated measuring process is of course not limited to the measuring representation of the relative movement of components of clutches, but can advantageously be used wherever different components with superimposed movements are to be observed; for example, measuring transmission distortions under load or deflections measurements of gear wheels, in the case of the movement of shift forks by means of a contactor roller. Particularly in the case of measuring tasks with many parameters, with the detection of paths, forces and speeds of locally separate components, it is possible to place the components as a computer model directly side-by-side and thus judge the mutual interaction.

The danger of a misinterpretation is low because, as a result of the very clear display, an erroneous positioning of an object would immediately cause striking movement sequences, body penetrations or changes of directions without any visible body contact. The visual display in the form of a computer animation therefore permits an additional plausibility control of all measured parameters and provides a deeper understanding of the measured operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for measuring the relative movement of at least two components, comprising:
    detecting series of measuring values of movement of the at least two components;
    adjusting at least two series of measuring values by comparing the measuring values at at least one point at which the ratio of the relative movements of the at least two components within the series of measuring values is known as a marginal condition;
    calculating a position and the alignment of all components in a reference system while standardizing the series of measuring values; and
    jointly displaying the standardized series of measuring values; wherein
    after an adjustment, the position of the at least two components is computed by determining and integrating speeds of the at least two components; and
    the position of the at least two components is then adjusted at a suitable point in time while using known marginal conditions, relative positions and constructive dimensions.

2. A process according to claim 1, wherein measurement and positional adjustment of the at least two components takes place during an event to be observed.

3. A process according to claim 1, wherein a series of measuring values is used for the standardization.

4. A process according to claim 1, wherein a measuring value from one of the series of measuring values is used for the standardization.

5. A process according claim 1, further comprising:

in addition to computing the position of the at least two components, estimating and computing position and alignment of components not detected by measuring.

6. A process according to claim 1, wherein the joint display of the series of standardized measuring values is displayed as time-parallel lines in diagram form.

7. A process according to claim 1, wherein for joint display of the series of standardized measuring values, images of the components are generated and are positioned using respective series of standardized measuring values for generating individual images for each measuring point, the individual images being combined to form an image sequence.

8. A process according to claim 7, wherein for imaging the components, multi-dimensional computer models are used which, in their geometry, are simulated in scale to actual dimensions of the individual components.

9. A process according to claim 1, comprising measuring movements during synchronization of a clutch having fixed wheel components, a loose wheel and sliding a sleeve, wherein:

longitudinal movement of the sliding sleeve, rotational speed of the fixed wheel components and rotational speed of the loose wheel are detected as series of measuring values;

the series of the measuring values for longitudinal movement of the sliding sleeve is modified by a position of the sliding sleeve in an engaged condition; and the series of measuring values for rotational speed is modified by a rotational speed that is identical in both the fixed wheel and the loose wheel when in an engaged condition.

10. A process according to claim 1, comprising measuring movements during synchronization of a clutch having fixed wheel components, a loose wheel and a sliding sleeve, wherein:

for the standardization, a series of measuring values representative of a rotational speed of either the fixed wheel or the loose wheel is used; and the series of measuring values for the rotational speed are standardized using said measuring value.

11. A process according to claim 1, comprising measuring movements during synchronization of a clutch having fixed wheel components, loose wheel and sliding sleeve, wherein:

for standardization, a measuring value representative of rotational speed of either the fixed wheel or the loose wheel in an engaged condition is used; and the series of the measuring values for rotational speed are standardized by using said measuring value.

12. A process according to claim 1, comprising measuring movements during synchronization of a clutch having fixed wheel components, loose wheel and sliding sleeve, wherein:

for joint display of the series of measuring values, the fixed wheel, the loose wheel and the sliding sleeve are displayed on a display system and animated using an associated standardized series of measuring values.

* * * * *